US009677492B2

(12) United States Patent
Kucharski et al.

(10) Patent No.: US 9,677,492 B2
(45) Date of Patent: Jun. 13, 2017

(54) SYSTEM AND METHOD FOR CONTROLLING A VEHICLE POWERTRAIN

(75) Inventors: Joseph F. Kucharski, Livonia, MI (US); Yuji Fujii, Ann Arbor, MI (US); Alexander O'Connor Gibson, Ann Arbor, MI (US); Nimrod Kapas, Dearborn, MI (US); Gregory Michael Pietron, Canton, MI (US); Diana Yanakiev, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 820 days.

(21) Appl. No.: 13/571,565

(22) Filed: Aug. 10, 2012

(65) Prior Publication Data

US 2014/0046557 A1 Feb. 13, 2014

(51) Int. Cl.
*B60W 10/06* (2006.01)
*B60W 10/10* (2012.01)
*F02D 41/22* (2006.01)

(52) U.S. Cl.
CPC ...... *F02D 41/22* (2013.01); *F02D 2200/1002* (2013.01); *F02D 2200/1004* (2013.01); *F02D 2400/11* (2013.01)

(58) Field of Classification Search
CPC .... B60W 10/14; B60W 10/16; B60W 50/038; B60W 50/04; B60W 2030/18081; B60W 2030/1809; B60W 2510/0657; B60W 2510/0661; B60W 2510/083; B60W 2510/084
USPC ............ 701/54, 69, 84, 87, 90; 180/65.265, 180/65.27, 65.275, 65.28, 65.285, 65.29
See application file for complete search history.

(56) References Cited

U.S. PATENT DOCUMENTS 6,128,564 A * 10/2000 Graf .................... B60W 10/06 477/102
6,305,347 B1 10/2001 Russell
6,754,574 B2 6/2004 Tokura et al.
6,846,260 B2 1/2005 Horiuchi
6,860,244 B2 3/2005 Glugla et al.
7,440,832 B2 10/2008 Steen et al.
7,664,588 B2 2/2010 Runde et al.
(Continued)

FOREIGN PATENT DOCUMENTS

CN 1842667 A 10/2006
CN 101233398 A 7/2008
(Continued)

OTHER PUBLICATIONS

Office Action dated Oct. 8, 2016 in co-pending Chinese Patent Application No. 201310341414.6.

*Primary Examiner* — Atul Trivedi
(74) *Attorney, Agent, or Firm* — David B. Kelley; Brooks Kushman P.C.

(57) ABSTRACT

A system and method for controlling a vehicle powertrain includes a controller that is operative to automatically control at least one powertrain function other than engine torque based on a measured torque and a predetermined torque range. The predetermined torque range is based on a first engine torque estimate. The measured torque is related to actual engine torque, and can be measured directly at the engine crankshaft, or in another location in the powertrain and then transferred to the engine space.

20 Claims, 2 Drawing Sheets

(56) References Cited

U.S. PATENT DOCUMENTS

| | | | | |
|---|---|---|---|---|
| 2002/0134637 | A1* | 9/2002 | Salecker | B60K 28/165 192/54.1 |
| 2003/0216215 | A1* | 11/2003 | Suzuki | B60K 6/46 477/5 |
| 2004/0034460 | A1* | 2/2004 | Folkerts | B60W 30/188 701/54 |
| 2004/0043866 | A1* | 3/2004 | Hrovat | B60W 10/02 477/100 |
| 2005/0000276 | A1 | 1/2005 | Bauer et al. | |
| 2005/0076882 | A1* | 4/2005 | Rayl | F02D 17/02 123/198 F |
| 2007/0088465 | A1* | 4/2007 | Heffington | G07C 5/085 701/1 |
| 2007/0288151 | A1* | 12/2007 | Kadono | B60W 50/06 701/54 |
| 2009/0037060 | A1* | 2/2009 | Carlhammar | B60K 6/387 701/54 |
| 2009/0118936 | A1* | 5/2009 | Heap | B60K 6/365 701/54 |
| 2009/0182481 | A1 | 7/2009 | Cook | |
| 2009/0314563 | A1* | 12/2009 | Burkholder | B60K 6/445 180/65.265 |
| 2009/0319136 | A1* | 12/2009 | Anderson | E02F 9/2246 701/54 |
| 2010/0038158 | A1* | 2/2010 | Whitney | B60K 6/365 180/65.265 |
| 2011/0112738 | A1 | 5/2011 | Reuschel | |
| 2011/0288734 | A1* | 11/2011 | Phillips | B60K 6/485 701/58 |
| 2015/0066265 | A1* | 3/2015 | Martin | B60W 20/15 701/22 |
| 2016/0221446 | A1* | 8/2016 | Suzuki | B60L 15/20 |

FOREIGN PATENT DOCUMENTS

| | | | |
|---|---|---|---|
| CN | 101473129 | A | 7/2009 |
| CN | 101795915 | A | 4/2010 |
| CN | 102060014 | A | 5/2011 |
| CN | 102101475 | A | 6/2011 |
| CN | 102628407 | A | 8/2012 |

* cited by examiner

SYSTEM AND METHOD FOR CONTROLLING A VEHICLE POWERTRAIN

TECHNICAL FIELD

The present invention relates to a system and method for controlling a vehicle powertrain.

BACKGROUND

Aftermarket companies routinely push the horsepower (HP) envelope of production level gas and diesel combustion engines through the use of aftermarket add-on products. These products include, but are not limited to, belt drive super chargers, exhaust gas driven turbo chargers, nitrous oxide injection, propane injection, and numerous other performance enhancing mechanisms. Though some such devices are designed to improve fuel economy or powertrain aesthetics, many increase an engine's HP beyond its own design limits and the capability of downstream driveline components. Breaches of these limits are manifest in failed components that would otherwise last beyond the manufacturer's powertrain warranty and the life cycle of the vehicle.

The less intuitive scenario, where aftermarket devices decrease the engine's HP below design intent, can also generate powertrain performance issues. For example, powertrain systems using an automatic transmission with torque-based algorithms for selecting oil pressure profiles to manage torque and speed exchanges between oncoming (ONC) and off-going (OFG) clutch elements during up-shift, downshift and engagement events will erroneously select high oil pressures for the ONC and OFG elements resulting in shift quality degradation. In addition to adding devices to a vehicle powertrain, modifying performance parameters by, for example, retuning an engine can also over time degrade powertrain performance and reduce component lifespan.

The addition of aftermarket devices and/or retuning or recalibrating powertrain components not only has a potentially deleterious effect on the powertrain, but can also result in false warranty claims being processed by vehicle manufacturers. Therefore, a need exists for a system and method for controlling a powertrain to account for aftermarket devices and/or modification of engine tuning parameters.

SUMMARY

At least some embodiments of the present invention include a method for controlling a vehicle powertrain including an engine. The method includes automatically controlling at least one powertrain function other than engine torque based on a measured torque related to actual engine torque and a predetermined torque range that is based on a first engine torque estimate.

At least some embodiments of the present invention include a method for controlling a vehicle powertrain including an engine, including automatically controlling at least one powertrain function other than engine torque based on a powertrain torque measured outside an engine space and a torque envelope.

At least some embodiments of the present invention include a control system for controlling a vehicle powertrain including an engine. The control system includes a controller configured to automatically control at least one powertrain function other than engine torque based on a measured torque related to actual engine torque and a predetermined torque range that is based on a first engine torque estimate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
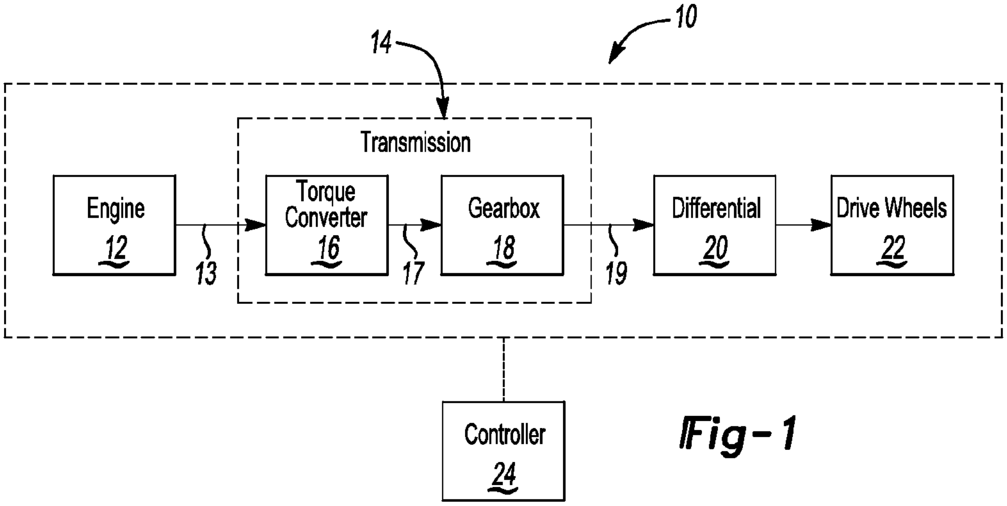
FIG. 1 is a schematic drawing of a vehicle powertrain and control system in accordance with an embodiment of the present invention.

FIG. 1 shows a powertrain 10, which includes an engine 12 whose output is directed to a transmission 14. The transmission 14 is generally made up of a torque converter 16 and a gearbox 18. The output from the transmission 14 is directed to a differential 20, which in turn transmits power to vehicle drive wheels 22. A control system, shown as a controller 24, controls various elements of the powertrain 10. It is understood that a powertrain control system may include any number of hardware and/or software controllers residing in different parts of the vehicle and communicating with one another, for example, through a controller area network (CAN).

As discussed above, it is important to determine when aftermarket modifications such as the addition of aftermarket devices or postproduction powertrain tuning has occurred. One way to accomplish this is to examine a measured engine torque and compare it to an engine torque estimated by a powertrain controller. In general, if deviations between the measured torque and the estimated torque are great enough, it can indicate the presence of aftermarket modifications. In order to obtain a measurement of engine torque, a torque sensor can be employed directly on an engine crankshaft, represented by the arrow 13 shown in FIG. 1. What may be more common in many vehicles, however, is a torque sensor within the transmission, such as the transmission 14. In such case, a torque sensor may be located at the output 17 of the torque converter 16 to measure the turbine torque, or may be located at the output shaft 19 to measure the transmission output torque.

Because there are often known relationships between the torques of the various powertrain components, it may be possible to transfer a measured powertrain torque that is measured outside an engine space to the engine space so as to have a measured torque related to an actual engine torque. If, for example, a torque is measured at the transmission output 19, one or more equations can be used to transfer that measured torque to the engine space. Although such a torque transfer may not be possible if the measurement occurs during a shift event of the transmission 14, measurements taken outside of shift events may be directly transferable to the engine space to provide information about engine torque.

One way to transfer this torque is to first transfer the torque from the transmission output 19 to the torque converter output 17. One equation that can be used to perform this function is:

$$TQtrb = TQos/\mathrm{GR}/\mathrm{GR\_effcy} \quad \text{Eq. 1}$$

where:

TQtrb is the turbine torque—i.e., the torque at the torque converter output 17, TQos is a measured torque at the output shaft 19 of the transmission 14, GR is the gear ratio of the gearbox 18, and GR_effcy is the gear efficiency for the gear that is engaged when the torque is measured.

Once having transferred the transmission output torque to the turbine space by equation 1, another equation is then used to transfer the turbine torque to the engine space. One equation that can be used to perform this function is:

$$TQeng = TQtrb/(TCamp + TQlos\_pmp) \quad \text{Eq. 2}$$

where:

TQeng is the measured torque transferred to the engine space,

TQtrb is the turbine torque determined by equation 1,

TCamp is the amplification of the torque converter 16, and

TQlos_pmp is a value representing oil pumping loss from the transmission.

The parameters used in equations 1 and 2—e.g., GR, GR_effcy, TCamp, TQlos_pmp—are generally known for a given transmission or type of transmission. For example, they may be provided through manufacturing specifications or determined empirically through measurements obtained at different rotational speeds, different oil temperatures, etc. Equations 1 and 2 represent one example of how a torque measured outside an engine space can be transferred to the engine space for use in controlling a powertrain, such as the powertrain 10 shown in FIG. 1. Torque sensors located at different positions within the powertrain may also have their measured torque transferred to the engine space as is known to those skilled in the art.

In order to determine if aftermarket modifications have occurred, a measured engine torque (including a torque measured outside the engine space and transferred to the engine space) can be compared to a torque estimated by a controller, such as the controller 24 shown in FIG. 1. Although a powertrain, such as the powertrain 10, may have many different controllers—e.g., an engine control module (ECM), a transmission control module (TCM), a powertrain control module (PCM), a vehicle system controller (VSC)—one or more of which work together to control various components of the powertrain, for illustrative purposes a single controller, the controller 24, is used to represent one or more of these.

Figure 2:
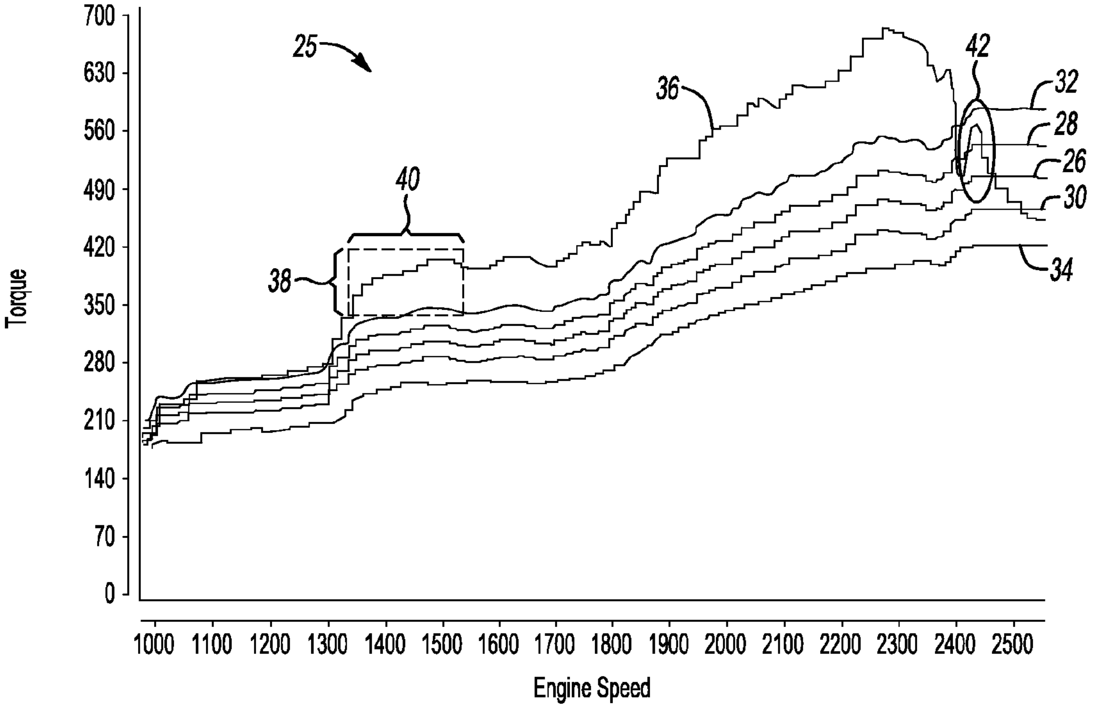
FIG. 2 is a graph showing measured engine torque, estimated engine torque, and various torque ranges related thereto.

As noted above, comparing a measured engine torque to an estimated engine torque can provide an indication of whether aftermarket modifications to the vehicle have occurred. It is understood, however, that powertrain components have inherent variability even when they are working correctly. Therefore, one or more torque ranges may be set around an engine torque estimate to provide an acceptable level of variability when comparing the torque estimate to the measured engine torque. FIG. 2 shows a graph 25 illustrating a number of different torque lines for an engine, such as the engine 12 shown in FIG. 1.

The line at 26 illustrates an engine torque estimate for various values of engine speed. A torque estimate, such as the torque estimate 26, can be calculated, for example, based on standard maps in engine control software. Such maps may be based on temperature, component friction, engine speed, inferred cylinder pressure, richness of fuel quality, etc. The first lines surrounding the engine torque 26 are the lines 28, 30, which represent a torque envelope, or a first predetermined torque range, wherein inherent variability of the torque output of the engine 12 is to be expected. This torque envelope may be based on data provided, for example, by an engine manufacturer based on known variability of production components. Thus, if a measured engine torque is within this range—i.e., between lines 28 and 30—it will be considered to have an acceptable deviation from the engine torque estimate. A torque within the torque envelope bounded by lines 28, 30 may be considered an allowable torque, designated as "TQallow".

FIG. 2 shows another band of torque lines 32, 34, which are outside the torque envelope bounded by lines 28, 30. The lines 32, 34 represent a torque threshold which, as explained in detail below, helps to provide a robust system and method for determining the presence of aftermarket modifications. A predetermined torque threshold is shown as a torque threshold envelope, indicated by the lines 32, 34, and may be set based on any number of factors. For example, the torque threshold may be specific to each specific powertrain, and may be based on a cumulative damage model for the weakest link in the powertrain. Powertrain components typically have some safety factor built into them to account for engine torque outputs that are beyond expected maximums. With this in mind, a torque threshold for some powertrains may be on the order of 25-50 lb-ft.

It is important to note that although the lines 28, 30 and 32, 34 shown in FIG. 2 appear to be generally symmetrical around the torque estimate 26, this is not necessarily the case. For example, it may be that a greater deviation is allowed for measured torques below the torque estimate 26 than above. This may be justified in some cases because of the greater problems caused by over-torque conditions as compared to under-torque conditions. Also shown in FIG. 2 is a trace 36 indicating measured engine torque. As discussed above, this torque can be measured directly, for example, on a crankshaft, such as the crankshaft 13, or it could be measured in another part of the powertrain and transferred to the engine space.

The vertical rise 38 shown in FIG. 2 indicates an amount of engine torque above the threshold line 32 which, as explained in detail below, may indicate the presence of aftermarket modifications that may initiate certain actions. The horizontal run 40 indicates that the high torque level has remained for a certain period of time. Even though the horizontal axis in FIG. 2 is shown in terms of engine speed, it may also be indicative of elapsed time. As with many control systems, it may be desirable to delay taking remedial or other action until a condition, such as the high torque value shown at 38, has occurred for a certain period of time as indicated by the time lapse 40. This helps to avoid unnecessary powertrain actions that are based on the presence of transient conditions, such as a transient torque spike shown by the circle 42 in FIG. 2.

Figure 3:
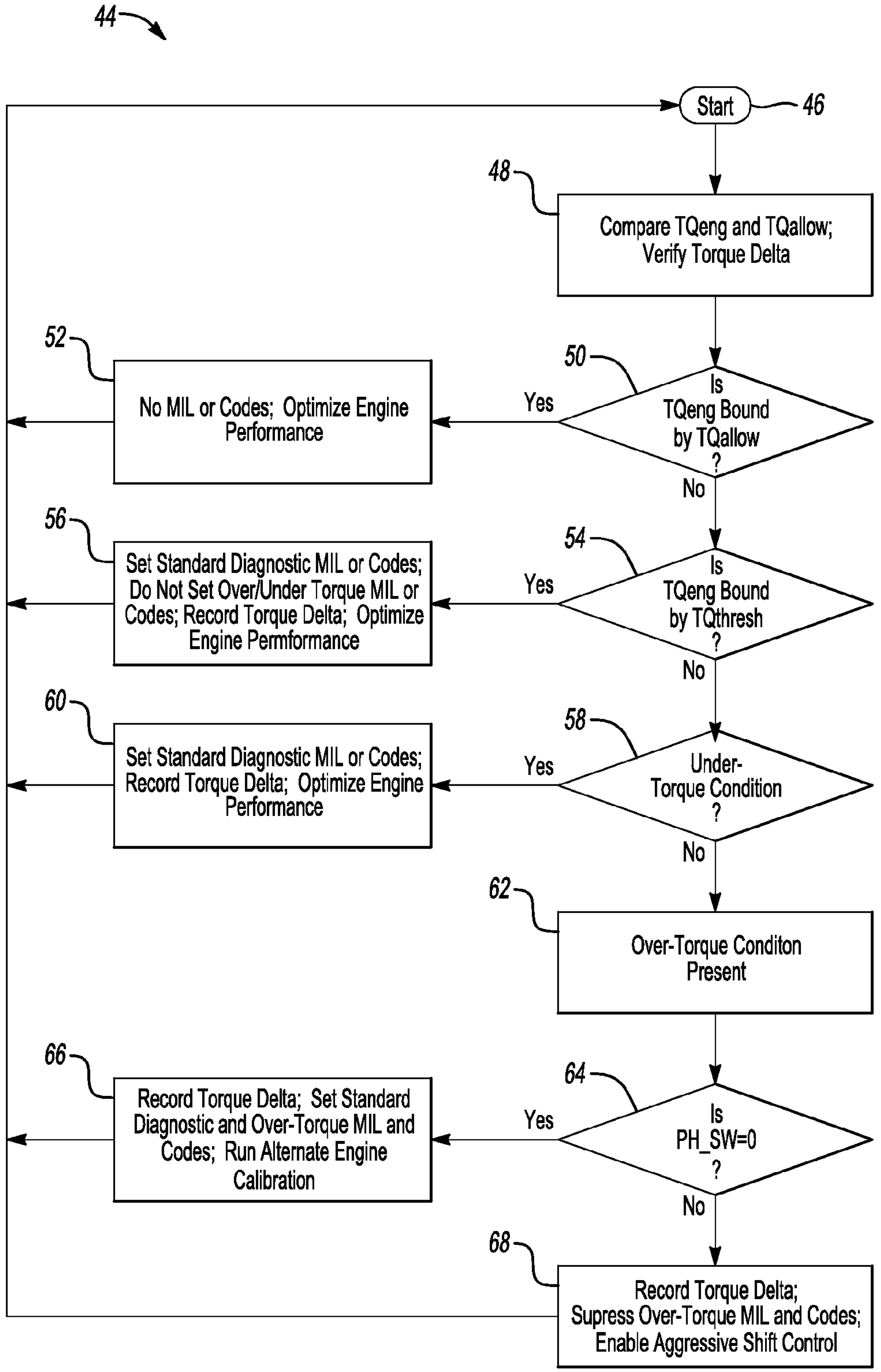
FIG. 3 is a flowchart illustrating a method in accordance with an embodiment of the present invention.

FIG. 3 shows a flowchart 44 illustrating a method in accordance with embodiments of the present invention. As discussed above, such a method may be executed, for example, by a controller, such as the controller 24 shown in FIG. 1. After starting the routine at 46, the first step 48 compares an engine torque (TQeng) to an allowable torque (TQallow). As discussed above, the engine torque may be a measured torque related to actual engine torque, measured either directly at the engine output or in another part of the powertrain and transferred to the engine space. Similarly, the allowable torque represents a predetermined torque range or torque envelope, which is based on an engine torque estimate such as described above. The step 48 also includes the command "Verify Torque Delta". This may be performed, for example, as described in conjunction with FIG. 2, wherein a certain difference in torque level is maintained for a predetermined period of time. It may also be required that there be at least a predetermined difference between the engine torque and the torque estimate in order for the torque delta to be verified. If the torque delta is not verified, the method may return to the start at 46.

After step 48, an inquiry is made at decision block 50 as to whether the engine torque is within the torque envelope. If it is, the controller 24 may take certain prescribed action such as modifying at least one engine function to "optimize engine performance". Because it was determined that the measured torque was within the bounds of the allowable torque, there is no need to set malfunction indicator lights (MIL) or to set engine operation codes (Codes) outside of their normal parameters. This is illustrated at step 52, after which, the method returns to the start 46. Optimizing engine performance as set forth in step 52 may be effected in any of a number of different ways, for example, by modifying at least one engine function based on the determined torque delta. In some embodiments, for example, fuel injector characterizations and/or friction/pumping losses may be adapted based on the difference determined between the engine torque and the engine torque estimate. Other optimized engine functions may include modifying fuel injection scheduling for different temperature gradients. Therefore, although embodiments of the present invention may take action that includes modifying engine torque, powertrain functions other than engine torque may also be controlled.

Because the measured torque is taken at a particular point in time, it is necessary to compare it to an estimated torque that is determined at substantially the same time. For purposes of discussion, the estimated torque may be conveniently referred to as a first engine torque estimate. Thus, in some embodiments, engine performance is optimized when the measured torque is greater than the first engine torque estimate by a predetermined amount, but it is still within the predetermined torque range or torque envelope—i.e., it is still bounded by the allowable torque. Optimizing the engine performance may cause an offset to the first engine torque estimate, which brings it closer to the value of the measured engine torque. As discussed above, the various torque envelopes, such as the envelopes bounded by lines 28, 30 and 32, 34 shown in FIG. 2, may or may not be symmetrical around the torque estimate 26. In addition, embodiments of the present invention may be concerned with and take action on only over-torque conditions (or under-torque conditions) to the exclusion of under-torque conditions (or over-torque conditions).

If, at decision block 50, it is determined that the engine torque is not within the allowable torque range, the method moves to another inquiry at decision block 54, where it is determined whether the engine torque is bounded by the torque threshold (TQthresh), for example, lines 32, 34 shown in FIG. 2. If it is, the method then moves to step 56, where a number of actions are taken. First, certain malfunction indicators or engine operation codes may be set, while others suppressed. In the embodiment shown in FIG. 3, a first malfunction indicator and a first engine operation code (Standard Diagnostic MIL or Codes) are set. Setting these malfunction indicators and/or engine operation codes are the result of the engine torque being outside of the allowable torque range; however, because it is not outside of the torque threshold, other, more severe malfunction indicators and codes are not set. Specifically, a second malfunction indicator and a second engine operation code (Over/Under Torque MIL or Codes) are not set. These will be reserved for situations where the engine torque is outside of the torque threshold.

In addition to setting certain malfunction indicators and/or engine operation codes, while suppressing others, step 56 also contemplates optimizing engine performance, for example, such as described above in step 52. Moreover, the measured torque difference or torque delta is recorded for future retrieval and control system use. It may be stored, for example, in a nonvolatile random access memory (NVRAM) of a controller, such as the controller 24. Storing these torque deltas and other torque deltas as described below, can provide a history of torque output and deviations useful not only in powertrain control but also for vehicle maintenance and even future powertrain design considerations. Although the various actions within step 56 are grouped together in a single step, embodiments of the invention contemplate that one or more of these actions may not be taken, and also contemplate that they can be taken in different chronological orders than are shown in the flow chart 44. If it is determined that decision block 54 that the measured torque is not bounded by the torque threshold, the method moves to decision block 58 where a another inquiry is made.

At decision block 58 it is determined whether an under-torque condition exists. It has already been determined through the previous steps that the measured engine torque is outside of the torque threshold, so it is understood that there is either an under-torque or an over-torque condition. As noted above, the under-torque condition, although not desirable, is usually not as detrimental to a powertrain as the over-torque condition. Therefore, embodiments of the present invention may omit this step if it is only an over-torque condition that is being analyzed and used as the basis of powertrain control. If at decision block 58 it is determined that an under-torque condition does exist, the controller 24 may automatically control the powertrain 10 to set at least one of a malfunction indicator or an engine operation code, record the determined torque delta, and/or optimize engine performance—see step 60.

If, conversely, it is determined at decision block 58 that an under-torque condition does not exist, then an over-torque condition is present as indicated at block 62. As discussed above, over-torque conditions can have a detrimental effect on powertrains; however, there may be times when a vehicle owner is willing to accept the potential problems associated with the extra wear and tear on the powertrain components. Moreover, a vehicle manufacturer may also accept this nonstandard use if the vehicle owner is willing to assume the risk. Thus, embodiments of the present invention contemplate the use of a "control switch", which may be, for example, a software switch located within a controller, such as the controller 24. The control switch may be indicative of whether production hardware is present or whether aftermarket modifications have been made. As used herein, references to "production hardware" imply production hardware with (at least close to) factory calibration and tuning. Therefore, in general, if the comparison of the engine torque to the torque estimate and ultimately the torque threshold indicates that certain action is desirable or required where production hardware is present, no action or different action may be taken where production hardware has been modified or aftermarket devices added.

Returning to the flow chart 44 shown in FIG. 3, decision block 64 makes the inquiry as to whether the control switch (PH_SW) is set to zero. In this embodiment, the switch being set to zero indicates the presence of production hardware, it is a "non-aftermarket" setting and is a factory default setting for the vehicle. Where the switch indicates that production hardware is present, certain actions may need to be taken because of the over-torque condition indicated at block 62. Therefore, at step 66 a number of actions may be taken, including recording the torque delta as in other steps, where it may be used later to analyze a torque history for the powertrain. In addition, both a first and second set of malfunction indicators and codes (Standard Diagnostic and Over-Torque MIL) may be set. Finally, an alternate engine calibration can be run so as to limit the torque output by the engine. This may be necessary, for example, to stop or at least limit potential damage to the powertrain components. If however, at decision block 64, it is determined that the switch is not set to zero, then step 68 provides an entirely different set of actions.

It is contemplated that the switch will be controllable only by service technicians authorized by the vehicle manufacturer. Thus, if a vehicle owner desires to modify the powertrain to obtain increased torque, and is willing to accept the potential reduced life to powertrain components, the owner may request that the factory-authorized service technician set the control switch to a setting indicative of aftermarket modifications. This may have a number of effects, including voiding factory warranties. It may also have the effect, as shown in step 68, of inhibiting the alternate engine calibration performed in step 66. Specifically, the torque of the engine will not be suppressed to avoid potential powertrain damage if the control switch has been set to the aftermarket setting. Therefore, in step 68, in addition to recording the torque delta, the over-torque malfunction indicators and engine operation codes are suppressed. In addition, a more aggressive shift control is enabled, which may control not only when, but also how the shift occurs. For example, higher transmission oil pressures may be applied to cause a gear shift, and/or the transmission may remain in lower gears for longer periods of time, thus allowing the vehicle operator greater acceleration and higher performance than are allowed under production hardware settings.

In summary, embodiments of the present invention can control various powertrain functions based on engine torque output and how it relates to a torque estimate and/or a predetermined torque range. Powertrain functions that can be controlled include modifying and/or adapting engine performance such as fuel injector characterizations and/or friction/pumping losses, as well as fuel injection scheduling for different temperature gradients. Control of other powertrain functions may include, for example, setting malfunction indicators and engine operation codes. Control of a transmission is also contemplated, for example, by allowing or suppressing aggressive shift control.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle powertrain including an engine, comprising:

automatically controlling at least one powertrain function other than engine torque based on a measured torque related to actual engine torque and a predetermined torque range that is based on a first engine torque estimate.

2. The method of claim 1, wherein automatically controlling at least one powertrain function includes modifying at least one engine function when the measured torque is greater than the first engine torque estimate by a predetermined amount and the measured torque is within the predetermined torque range.

3. The method of claim 1, wherein automatically controlling at least one powertrain function includes activating at least one of a first malfunction indicator or a first engine operation code, and suppressing at least one of a second malfunction indicator or a second engine operation code, when the measured torque is: greater than the first engine torque estimate, outside the predetermined torque range, and within a predetermined torque threshold.

4. The method of claim 1, wherein automatically controlling at least one powertrain function includes activating at least one of a malfunction indicator or an engine operation code when: the measured torque is less than the first engine torque estimate, outside the predetermined torque range, and outside a predetermined torque threshold.

5. The method of claim 1, wherein automatically controlling at least one powertrain function includes activating at least one of a malfunction indicator or an engine operation code when a control switch is set to a non-aftermarket setting and the measured torque is: greater than the first engine torque estimate, outside the predetermined torque range, and outside a predetermined torque threshold.

6. The method of claim 1, further comprising limiting engine torque when a control switch is set to a non-aftermarket setting and the measured torque is: greater than the first engine torque estimate, outside the predetermined torque range, and outside a predetermined torque threshold.

7. The method of claim 1, wherein automatically controlling at least one powertrain function includes suppressing malfunction indicators and engine operation codes related to engine over-torque when a control switch is set to an aftermarket setting and the measured torque is: greater than the first engine torque estimate, outside the predetermined torque range, and outside a predetermined torque threshold.

8. A method for controlling a vehicle powertrain including an engine, comprising:

automatically controlling at least one powertrain function other than engine torque based on a powertrain torque measured outside an engine space and a torque envelope.

9. The method of claim 8, further comprising transferring the measured powertrain torque to the engine space to provide a measurement of engine torque, and wherein the torque envelope is based on a first engine torque estimate.

10. The method of claim 9, wherein automatically controlling at least one powertrain function includes modifying at least one engine function when the engine torque is: different from the first engine torque estimate by a predetermined amount and within the torque envelope.

11. The method of claim 9, wherein automatically controlling at least one powertrain function includes modifying at least one engine function when the engine torque is: different from the first engine torque estimate by a predetermined amount, outside the torque envelope, and within a predetermined torque threshold that is outside the torque envelope.

12. The method of claim 9, wherein automatically controlling at least one powertrain function includes activating at least one of a first malfunction indicator or a first engine operation code, and suppressing at least one of a second malfunction indicator or a second engine operation code, when the engine torque is: different from the first engine torque estimate by a predetermined amount, outside the torque envelope, and within a predetermined torque threshold that is outside the torque envelope.

13. The method of claim 9, wherein automatically controlling at least one powertrain function includes activating at least one of a malfunction indicator or an engine operation code when: the engine torque is less than the first engine torque estimate, outside the torque envelope, and outside a predetermined torque threshold that is outside the torque envelope.

14. The method of claim 9, wherein automatically controlling at least one powertrain function includes activating at least one of a malfunction indicator or an engine operation code when a control switch is set to a non-aftermarket setting and the engine torque is: greater than the first engine torque estimate, outside the torque envelope, and outside a predetermined torque threshold that is outside the torque envelope.

15. The method of claim 9, further comprising limiting engine torque when a control switch is set to a non-aftermarket setting and the engine torque is: greater than the first engine torque estimate, outside the torque envelope, and outside a predetermined torque threshold that is outside the torque envelope.

16. The method of claim 9, wherein automatically controlling at least one powertrain function includes suppressing malfunction indicators and engine operation codes related to engine over-torque when a control switch is set to an aftermarket setting and the engine torque is: greater than the first engine torque estimate, outside the torque envelope, and outside a predetermined torque threshold that is outside the torque envelope.

17. A control system for controlling a vehicle powertrain including an engine, comprising:

a controller configured to automatically control at least one powertrain function other than engine torque based on a measured torque related to actual engine torque and a predetermined torque range that is based on a first engine torque estimate.

18. The control system of claim 17, wherein the controller automatically controlling at least one powertrain function includes the controller activating at least one of a malfunction indicator or an engine operation code when a control switch is set to a non-aftermarket setting and the measured torque is: greater than the first engine torque estimate, outside the predetermined torque range, and outside a predetermined torque threshold.

19. The control system of claim 17, wherein the controller is further configured to limit engine torque when a control switch is set to a non-aftermarket setting and the measured torque is: greater than the first engine torque estimate, outside the predetermined torque range, and outside a predetermined torque threshold.

20. The control system of claim 17, wherein the controller automatically controlling at least one powertrain function includes the controller suppressing malfunction indicators and engine operation codes related to engine over-torque when a control switch is set to an aftermarket setting and the measured torque is: greater than the first engine torque estimate, outside the predetermined torque range, and outside a predetermined torque threshold.

* * * * *